(12) United States Patent
Koehler et al.

(10) Patent No.: US 10,302,177 B2
(45) Date of Patent: May 28, 2019

(54) FRICTION DRIVEN BELTLESS GRAIN SPREADER

(71) Applicants: Matthew Koenen Koehler, Meservey, IA (US); Randal L. Marcks, St. Ansgar, IA (US)

(72) Inventors: Matthew Koenen Koehler, Meservey, IA (US); Randal L. Marcks, St. Ansgar, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 0 days.

(21) Appl. No.: 15/803,194

(22) Filed: Nov. 3, 2017

(65) Prior Publication Data

US 2018/0128356 A1    May 10, 2018

Related U.S. Application Data

(60) Provisional application No. 62/417,816, filed on Nov. 4, 2016.

(51) Int. Cl.
| | |
|---|---|
| *A01C 17/00* | (2006.01) |
| *F16H 13/10* | (2006.01) |
| *B65G 65/48* | (2006.01) |
| *A01F 25/14* | (2006.01) |
| *B65G 69/04* | (2006.01) |

(52) U.S. Cl.
CPC ......... *F16H 13/10* (2013.01); *B65G 65/4836* (2013.01); *A01C 17/005* (2013.01); *A01F 25/14* (2013.01); *B65G 69/0441* (2013.01); *B65G 69/0458* (2013.01); *B65G 2201/042* (2013.01)

(58) Field of Classification Search
CPC ........ A01C 17/005; F16H 13/00; F16H 13/10
See application file for complete search history.

(56) References Cited

U.S. PATENT DOCUMENTS

| | | | | |
|---|---|---|---|---|
| 782,978 | A | * 2/1905 | Magruder | ............... F16H 13/10 474/131 |
| 1,289,818 | A | * 12/1918 | Kurkjian | ................. F16H 13/10 476/66 |

(Continued)

OTHER PUBLICATIONS

Brock, Grain Spreaders, Brochure, All pages, Jan. 1, 2015, Milford Indiana.

*Primary Examiner* — Mark C Hageman
(74) *Attorney, Agent, or Firm* — Christopher A. Proskey; BrownWinick Law Firm

(57) ABSTRACT

A friction driven beltless grain spreader system is presented that includes a spreader cone having a pulley and a grain deflector configured to disperse the flow of grain. A motor having a driven wheel and an idler wheel are pivotally connected to the spreader cone in operative engagement with the pulley such that the idler wheel is positioned between the driven wheel and the pulley. A tension member applies a force that pulls the driven wheel and intermediary wheel into the pulley. As the motor rotates the driven wheel rotates the idler wheel which rotates the pulley. When forces spike, such as when the motor is turned on or a heavy flow of grain hits the system, one or more of the driven wheel, intermediary wheel and/or pulley slip with respect to the other wheels thereby preventing breakage of the system.

22 Claims, 11 Drawing Sheets

(56) References Cited

U.S. PATENT DOCUMENTS

| | | | | |
|---|---|---|---|---|
| 3,215,411 | A | * | 11/1965 | Pitts .................... B28C 5/421 |
| | | | | 366/61 |
| 3,371,870 | A | * | 3/1968 | Harrer ................ A01C 17/005 |
| | | | | 222/252 |
| 3,615,059 | A | * | 10/1971 | Moeller ................. B02C 11/04 |
| | | | | 241/186.4 |
| 3,902,610 | A | * | 9/1975 | Sukup ................. A01F 25/186 |
| | | | | 239/665 |
| 4,318,511 | A | * | 3/1982 | Clark ................ B65G 69/0458 |
| | | | | 239/684 |
| 4,448,361 | A | * | 5/1984 | Marcy .................... A01F 29/00 |
| | | | | 241/101.761 |
| 4,583,415 | A | * | 4/1986 | Locker .................... B07B 1/08 |
| | | | | 209/369 |
| 5,020,701 | A | * | 6/1991 | Donelson .......... B65G 69/0458 |
| | | | | 222/494 |
| 5,735,319 | A | * | 4/1998 | McNamara ............ B65B 37/12 |
| | | | | 141/286 |
| RE36,486 | E | * | 1/2000 | Hughes ................ B02C 18/067 |
| | | | | 241/101.761 |
| 7,140,566 | B2 | * | 11/2006 | Hughes ................ B02C 18/067 |
| | | | | 241/101.761 |
| 7,384,369 | B2 | * | 6/2008 | Wimmer ................ F02B 67/04 |
| | | | | 123/198 C |

* cited by examiner

FRICTION DRIVEN BELTLESS GRAIN SPREADER

REFERENCE TO RELATED APPLICATIONS

This utility patent application claims priority to provisional patent application Ser. No. 62/417,816 filed on Nov. 4, 2016.

FIELD OF THE INVENTION

This invention relates to grain handling devices. More specifically and without limitation, this invention relates to a friction driven beltless grain spreading device for grain bins and other bulk grain storage devices.

BACKGROUND OF THE INVENTION

Grain bins are massive devices used to store bulk flowable grain products such as corn, soybeans, wheat, rice, or any other grain. Conventional grain bins are generally formed in a cylindrical shape with a corrugated sidewall covered by a peaked roof. Grain bins vary in height and diameter and storage capacity and can range from a few thousand bushels to well over a million bushels.

To fill a grain bin, flowable grain is carried by an auger, bucket elevator or other material handling device above the grain bin roof. This grain is then poured by a spout through an opening in the center of the peaked roof. Extreme care must be taken when filling a grain bin to ensure that the grain, as well as the fines therein, is more evenly distributed within the grain bin. Due to the flow properties of grain, grain is not completely self-leveling and therefore the manner in which the grain is poured into the grain bin can cause an uneven distribution within the grain bin. This is due to the angle of repose which is the steepest angle of descent or dip relative to the horizontal plane to which a material can be piled without slumping. While grain bins are engineered to withstand unbalanced forces, an uneven distribution of grain within a grain bin can have catastrophic effects, such as structural failure. Even if the grain bin does not fail, the uneven distribution of grain within the grain bin can cause uneven airflow through the grain which can lead to uneven moisture levels within the stored grain which can lead to spoilage.

To help prevent uneven filling of grain bins, various grain spreading devices have been developed. These grain spreading devices are generally positioned in the center of the grain bin just below the opening in the peak of the grain bin roof. These grain spreading devices serve to catch the grain, as well as the fines therein, as it is poured into the grain bin and redirects the grain, as well as the fines therein, to provide a more even distribution of the grain, as well as the fines therein, within the grain bin. Conventional grain spreaders can be separated into two broad categories, unpowered grain spreaders and powered grain spreaders.

Unpowered grain spreaders serve to direct or redirect the flow of grain without the use of motorization. These unpowered grain spreaders are often formed of an arrangement of shoots, funnels, tubes or gravity feed spinners and aim to more evenly distribute grain, as well as the fines therein, within a grain bin without electric power and motorization. While effective in some applications, conventional unpowered grain spreaders suffer from many disadvantages.

Namely, due to their often sophisticated configuration and reliance on gravity for proper operation, unpowered grain spreaders are often incapable of overcoming the biased or uneven manner in which the grain is poured into the unpowered grain spreader thereby causing the distribution coming out of the grain spreader to itself be biased or uneven. Furthermore, many unpowered grain spreaders are large and sophisticated devices which are expensive to manufacture, are formed of a great number of parts, and require complex assembly within the grain bin. Further yet, many unpowered grain spreaders simply do not spread grain, as well as the fines therein, as evenly as many powered grain spreaders. As such, unpowered grain spreaders are not suitable or desirable in many applications.

Powered grain spreaders, like unpowered grain spreaders, serve to direct or redirect the flow of grain, as well as the fines therein, to facilitate more even distribution of the grain, as well as the fines therein, within the grain bin. Unlike unpowered grain spreaders, powered grain spreaders include a motor that rotates portions of the spreading device. While powered grain spreaders provide many advantages over unpowered grain spreaders, or using no grain spreader at all, conventional powered grain spreaders suffer from many disadvantages.

Namely, many powered grain spreaders use a belt and pulley system to connect the output of a motor to a rotating impeller or pan of the spreading device also known as a deflector. Due to the harsh operating environment within the grain bin, which is extremely dusty and can range from extreme heat and humidity to freezing temperatures and low humidity, these belts can work themselves loose or prematurely fail rendering the spreader inoperable. This requires an operator to climb within the grain bin to service the grain spreader which often requires tightening or replacing the belt. In some cases, the belt can come off of the grain spreader and into the grain bin where the loose belt can cause a host of other problems such as getting wrapped around an auger or sweep, plugging a grain outlet or getting caught in a bucket elevator, drier or other component of a grain handling system.

As an alternative to belt driven grain spreaders, Brock Grain Systems—A Division of CTB, Inc. having an address of 611 N Higbee Street, P.O. Box 2000, Milford, Ind. 46542 U.S.A. offers a powered grain spreader with an in-line gear reducer. While this arrangement eliminates some of the problems prevalent with belt driven grain spreaders, this arrangement provides a whole host of other problems.

Namely, this arrangement places the motor directly in the path of the falling grain. Positioning the motor in this manner can reduce the capacity of the grain spreader while exposing the motor to the constant beating of the falling grain. In addition, because the motor is placed directly in the path of the falling grain, special precautions must be taken to protect the motor from the grain and from the contamination and infiltration of grain and grain particles. This can be done by fully enclosing, sealing or encapsulating the motor. Enclosing the motor in this manner can limit the motor's ability to dissipate heat and can make the motor susceptible to overheating and therefore premature failure. Making matters worse, hot grain is often poured straight out of the grain dryer and into the grain bin and therefore onto the already heat-challenged motor, which can exasperate the motor's limited ability to dissipate heat.

Additional disadvantages of this system are caused by using an in-line gear reducer. Namely, an in-line gear reducer that can withstand use in the harsh environment of a grain bin spreader is a relatively sophisticated and expensive component formed of precisely machined parts which require special care and consideration such as lubrication and contamination prevention. In addition, these in-line gear reducers are susceptible to breakage because the gears in the gear reducer do not allow for any slippage or give, and instead they can only break when a heavy load is suddenly applied which often occurs when the initial flow of grain hits a freewheeling grain spreader. As such, the inability of an in-line gear reducer to slip or give upon the sudden introduction of grain can cause premature failure, as can the loss of lubrication or infiltration of contamination.

Therefore, for all the reasons stated above, and the reasons stated below, there is a need in the art for a friction driven beltless grain spreader.

Thus, it is a primary object of the invention to provide a friction driven beltless grain spreader that improves upon the state of the art.

Another object of the invention is to provide a friction driven beltless grain spreader that has a long useful life.

Yet another object of the invention is to provide a friction driven beltless grain spreader that is durable.

Another object of the invention is to provide a friction driven beltless grain spreader that places the motor outside of the flow of grain.

Yet another object of the invention is to provide a friction driven beltless grain spreader that provides a sufficient amount of give when forces spike.

Another object of the invention is to provide a friction driven beltless grain spreader that allows for slippage between the motor and the grain spreader when necessary.

Yet another object of the invention is to provide a friction driven beltless grain spreader that eliminates the use of a belt.

Another object of the invention is to provide a friction driven beltless grain spreader that eliminates the use of direct-drive gears.

Yet another object of the invention is to provide a friction driven beltless grain spreader that reduces maintenance.

Another object of the invention is to provide a friction driven beltless grain spreader that provides more even spreading of grain.

Yet another object of the invention is to provide a friction driven beltless grain spreader that does not require sealing of the motor.

Another object of the invention is to provide a friction driven beltless grain spreader that does not inhibit cooling of the motor.

Yet another object of the invention is to provide a friction driven beltless grain spreader that is reliable.

Another object of the invention is to provide a friction driven beltless grain spreader that is easy to manufacture.

Yet another object of the invention is to provide a friction driven beltless grain spreader that allows for forward and reverse operation.

Another object of the invention is to provide a friction driven beltless grain spreader that is relatively inexpensive.

Yet another object of the invention is to provide a friction driven beltless grain spreader that has a robust design.

Another object of the invention is to provide a friction driven beltless grain spreader that is high quality.

Yet another object of the invention is to provide a friction driven beltless grain spreader that reduces downtime.

Another object of the invention is to provide a friction driven beltless grain spreader that improves efficiencies.

Yet another object of the invention is to provide a friction driven beltless grain spreader that facilitates adjustable tension.

These and other objects, features, or advantages of the invention will become apparent from the specification, figures and claims.

SUMMARY OF THE INVENTION

A friction driven beltless grain spreader system is presented that includes a spreader cone having a pulley and a grain deflector configured to disperse the flow of grain. A motor having a driven wheel and an idler wheel are pivotally connected to the spreader cone in operative engagement with the pulley such that the idler wheel is positioned between the driven wheel and the pulley. A tension member applies a force that pulls the driven wheel and intermediary wheel into the pulley. As the motor rotates the driven wheel rotates the idler wheel which rotates the pulley. When forces spike, such as when the motor is turned on or a heavy flow of grain hits the system, one or more of the driven wheel, intermediary wheel and/or pulley slip with respect to the other wheels thereby preventing breakage of the system. The system also includes an adjustment member that allows for quick and easy adjustment of the tension.

DETAILED DESCRIPTION OF THE INVENTION

Figure 1:
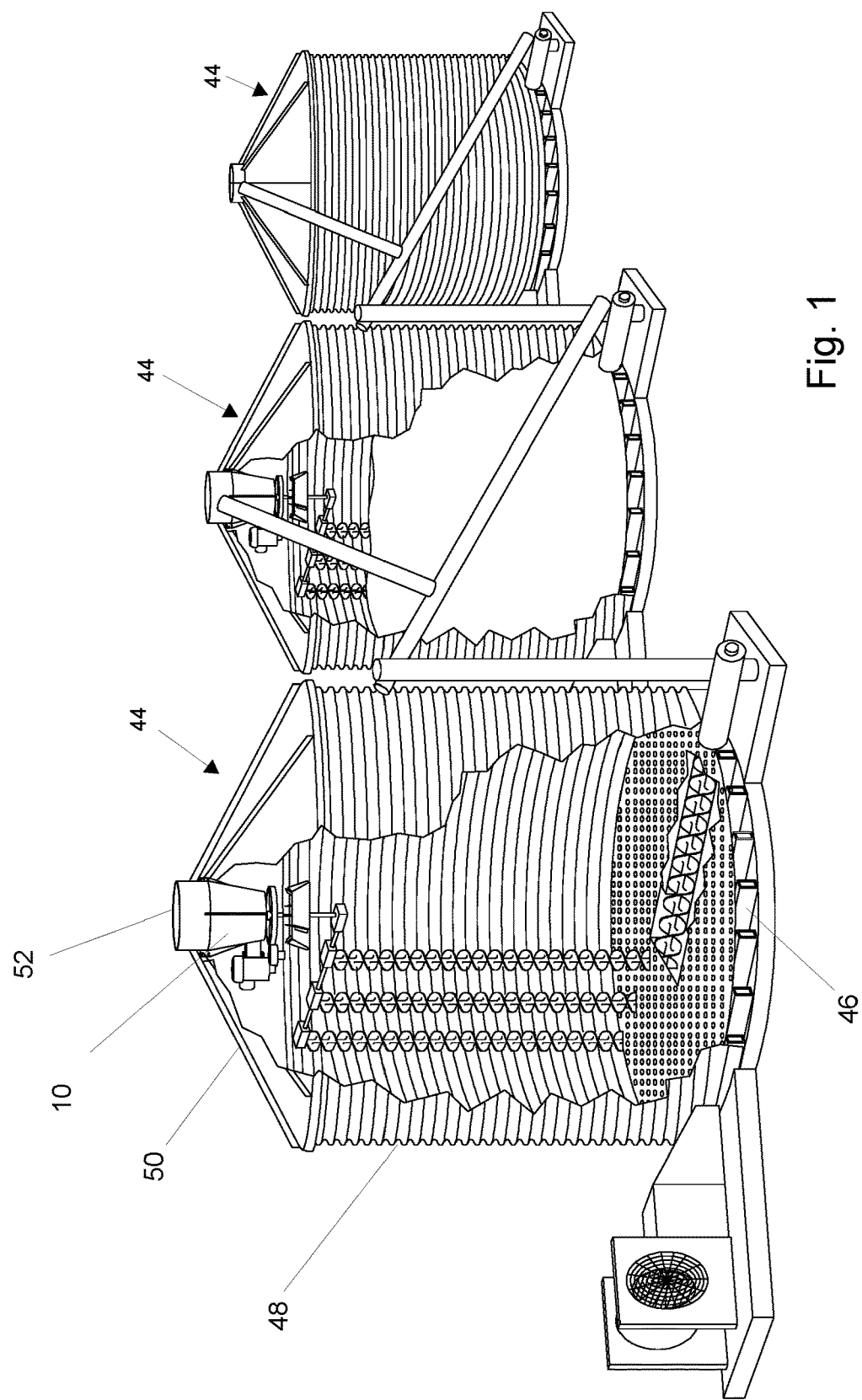
FIG. 1 is a perspective view of a plurality of grain bins used for the storage of grain, the view showing the grain bins having a corrugated metal wall, a peaked roof and an elevated floor; the view showing an opening at the center of the roof and a friction driven grain spreader system positioned below the opening which is configured to spread grain evenly throughout the grain bin.
Figure 2:
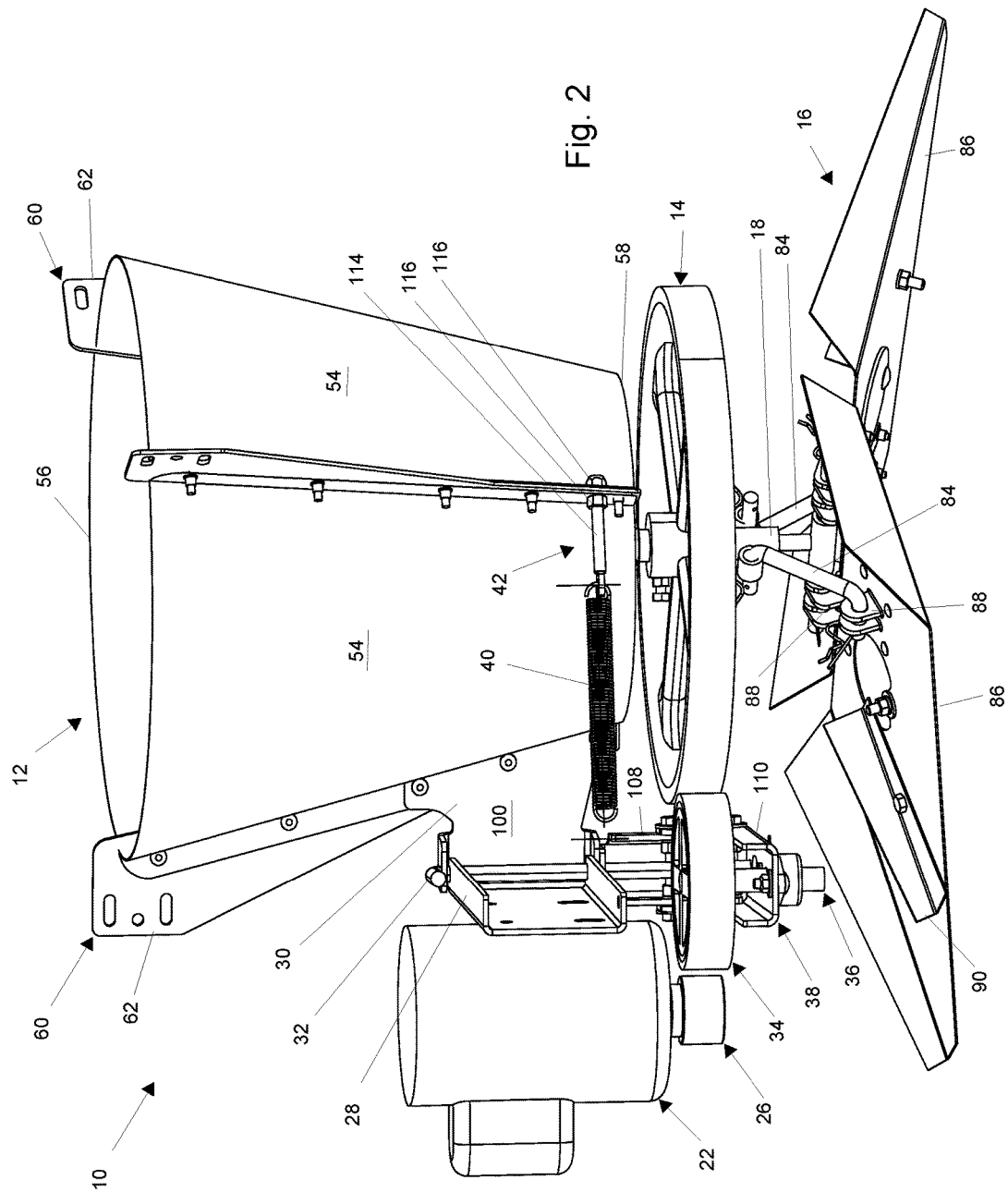
FIG. 2 is a perspective view of a front side of a friction driven grain spreader system, the view showing a spreader cone, a pulley wheel, a spreader pan, a motor having a driven wheel and an idler wheel that work in concert with one another to facilitate the spreading of grain while allowing a desired amount of slip or give between the motor and the pulley wheel.
Figure 3:
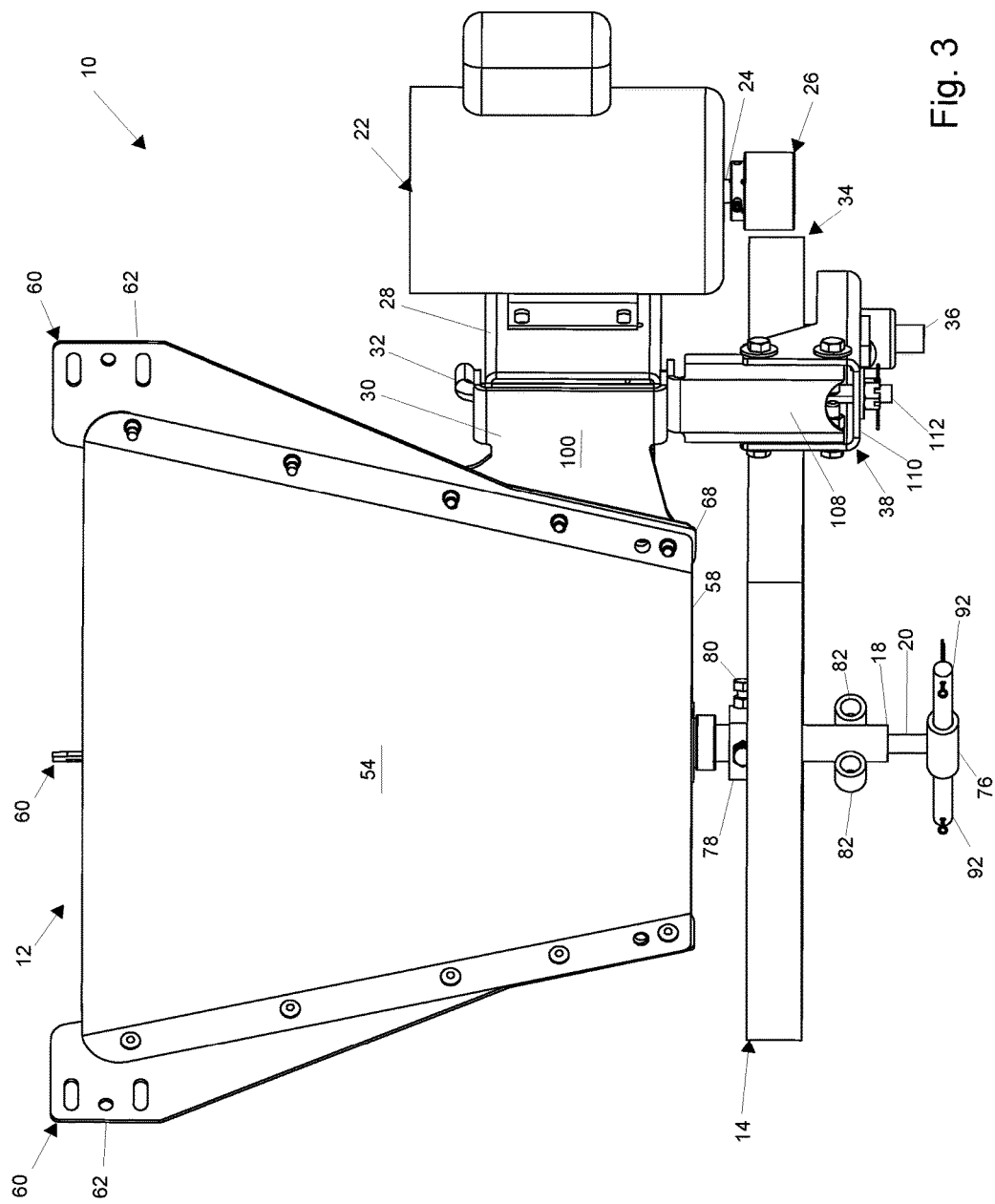
FIG. 3 is an elevation view of a rear side of the friction driven grain spreader system of FIG. 2.
Figure 4:
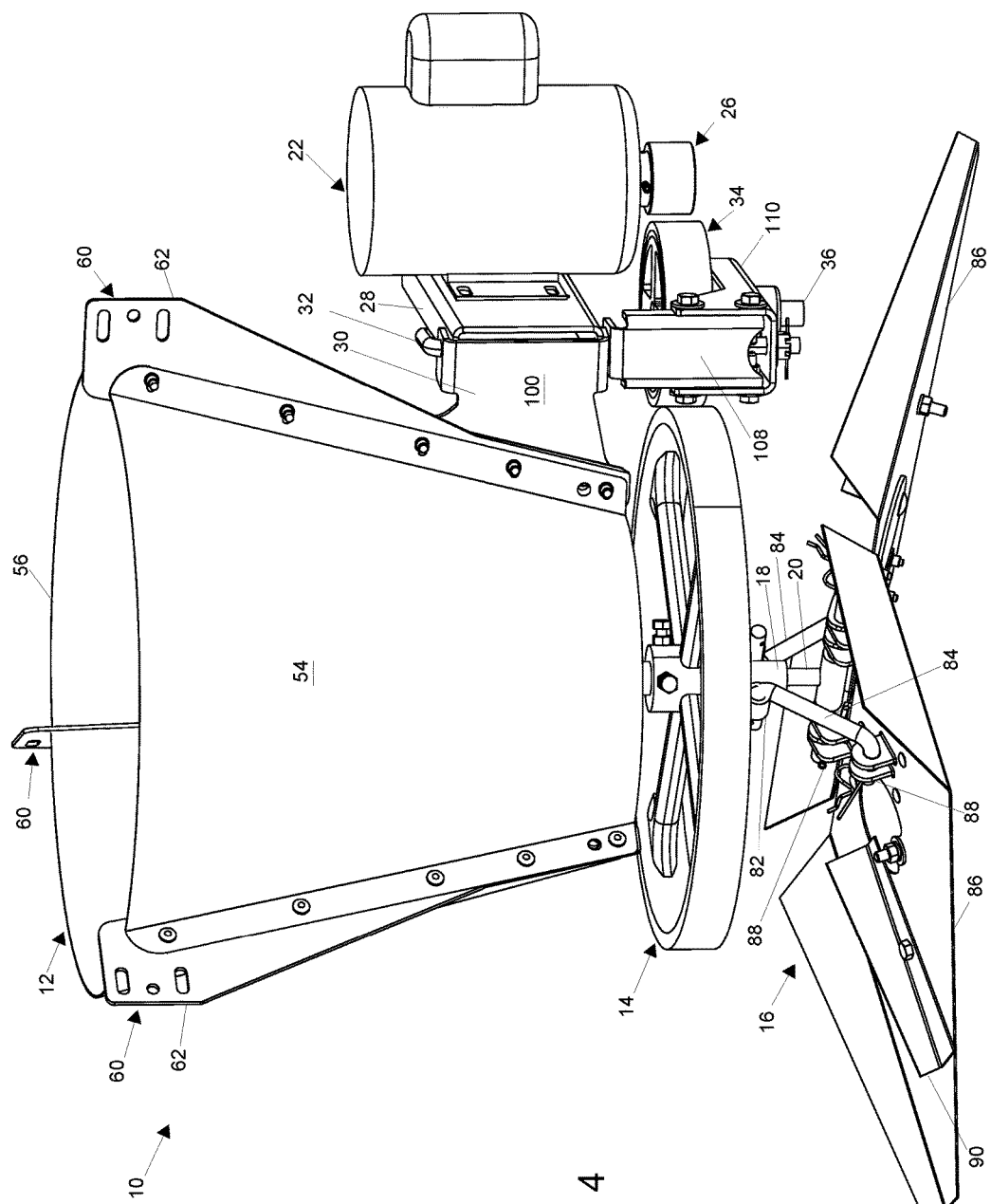
FIG. 4 is a perspective view of a rear side of the friction driven grain spreader system of FIG. 2.
Figure 5:
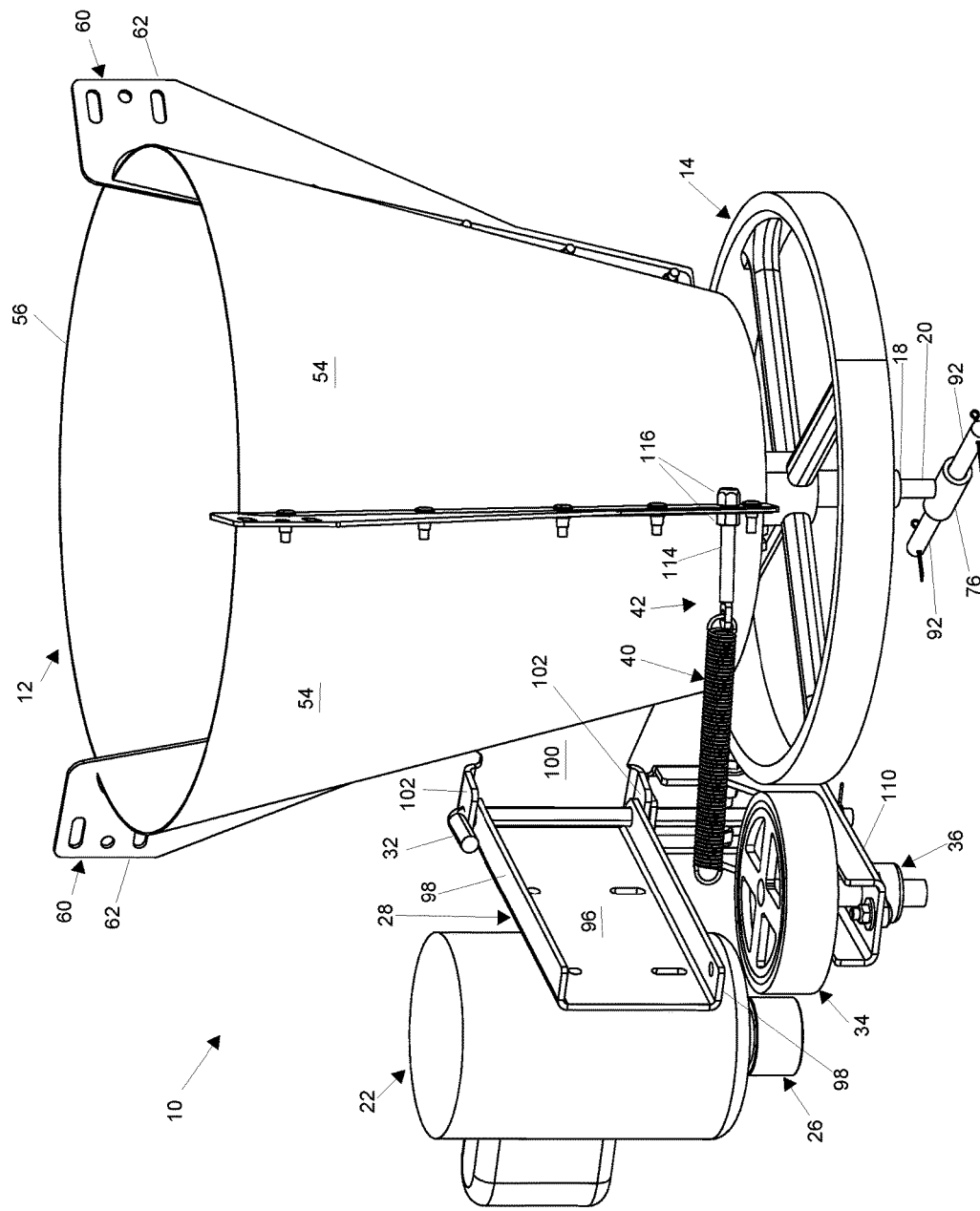
FIG. 5 is a perspective view of a front side of the friction driven grain spreader system of FIG. 2, the view showing the spreader pan removed.
Figure 6:
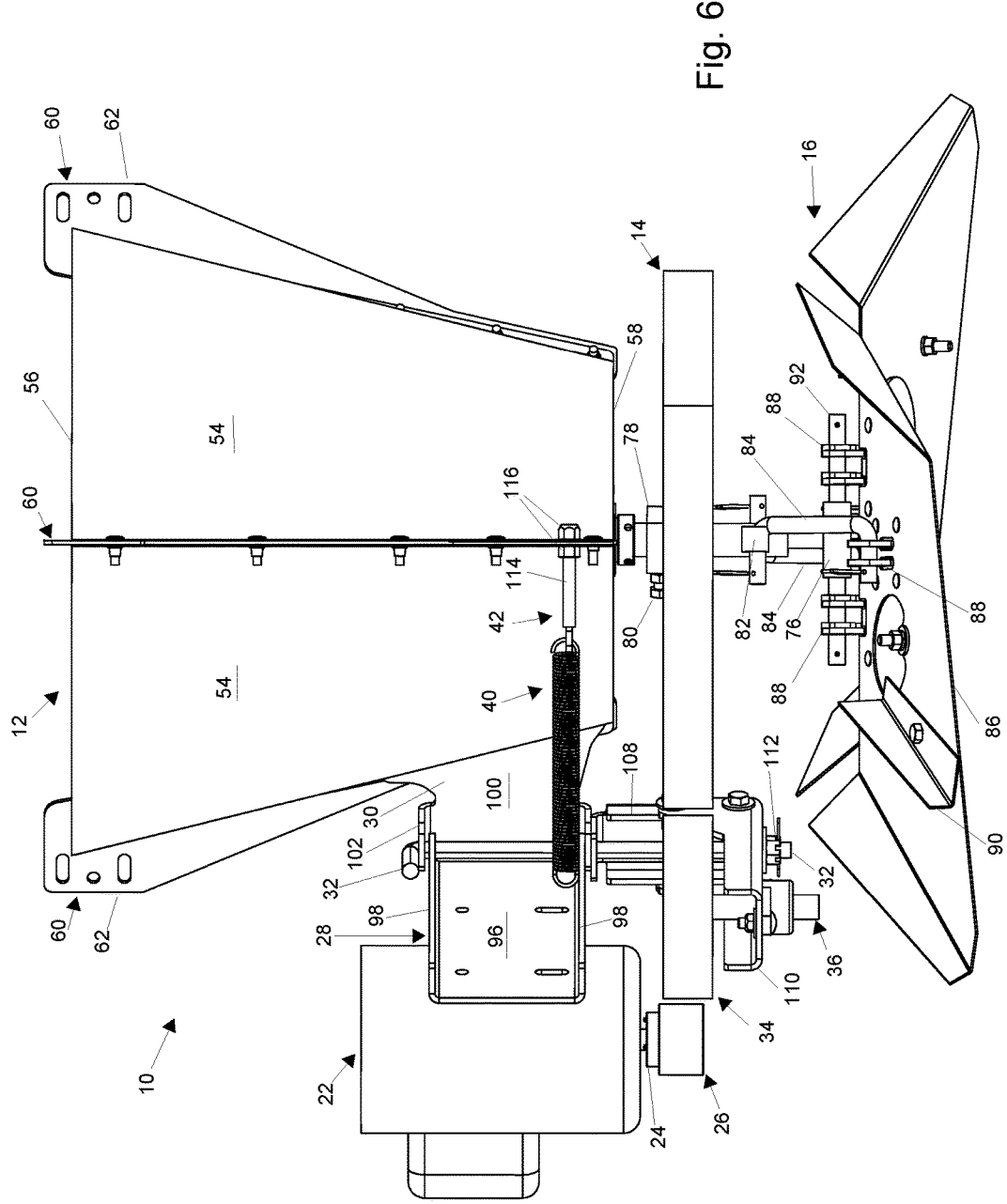
FIG. 6 is an elevation view of a front side of the friction driven grain spreader system of FIG. 2.
Figure 7:
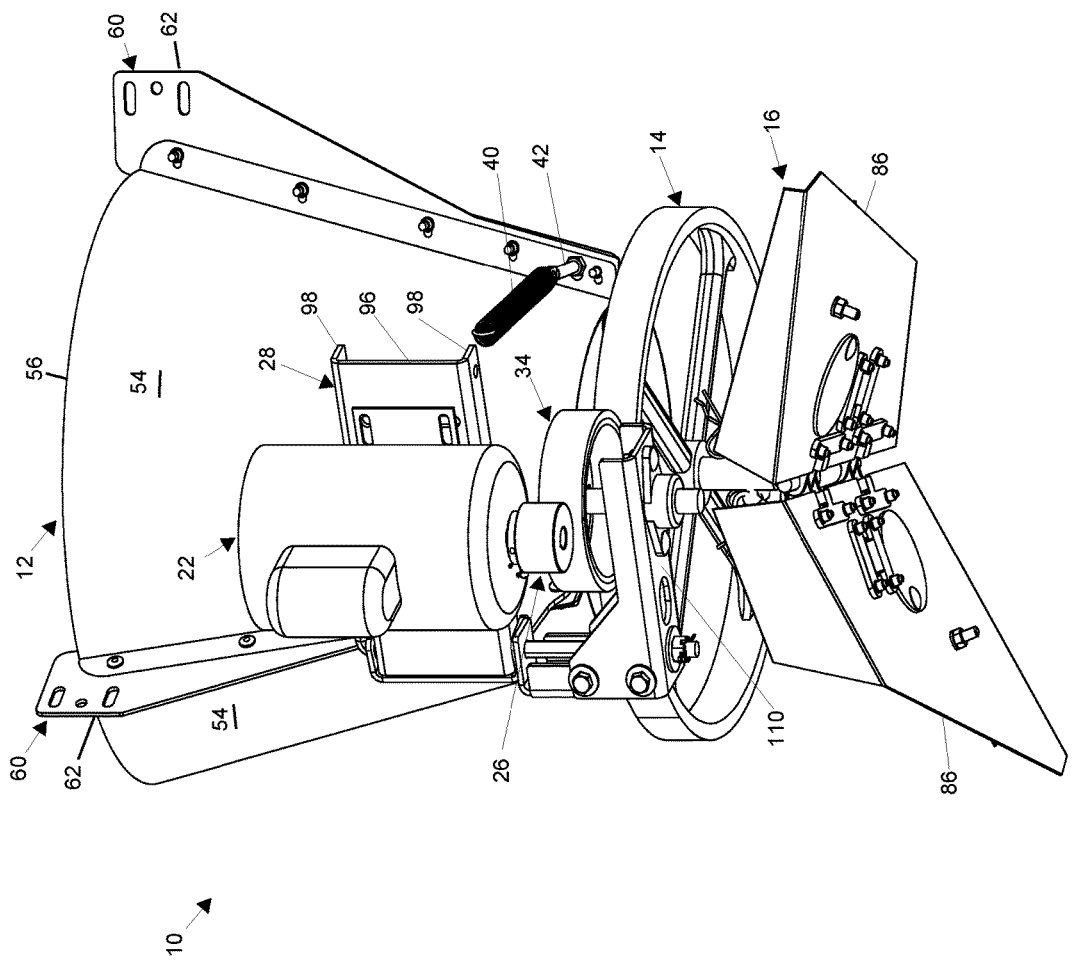
FIG. 7 is an elevation view of a side of the friction driven grain spreader system of FIG. 2, the view showing the bottom side of the system.
Figure 8:
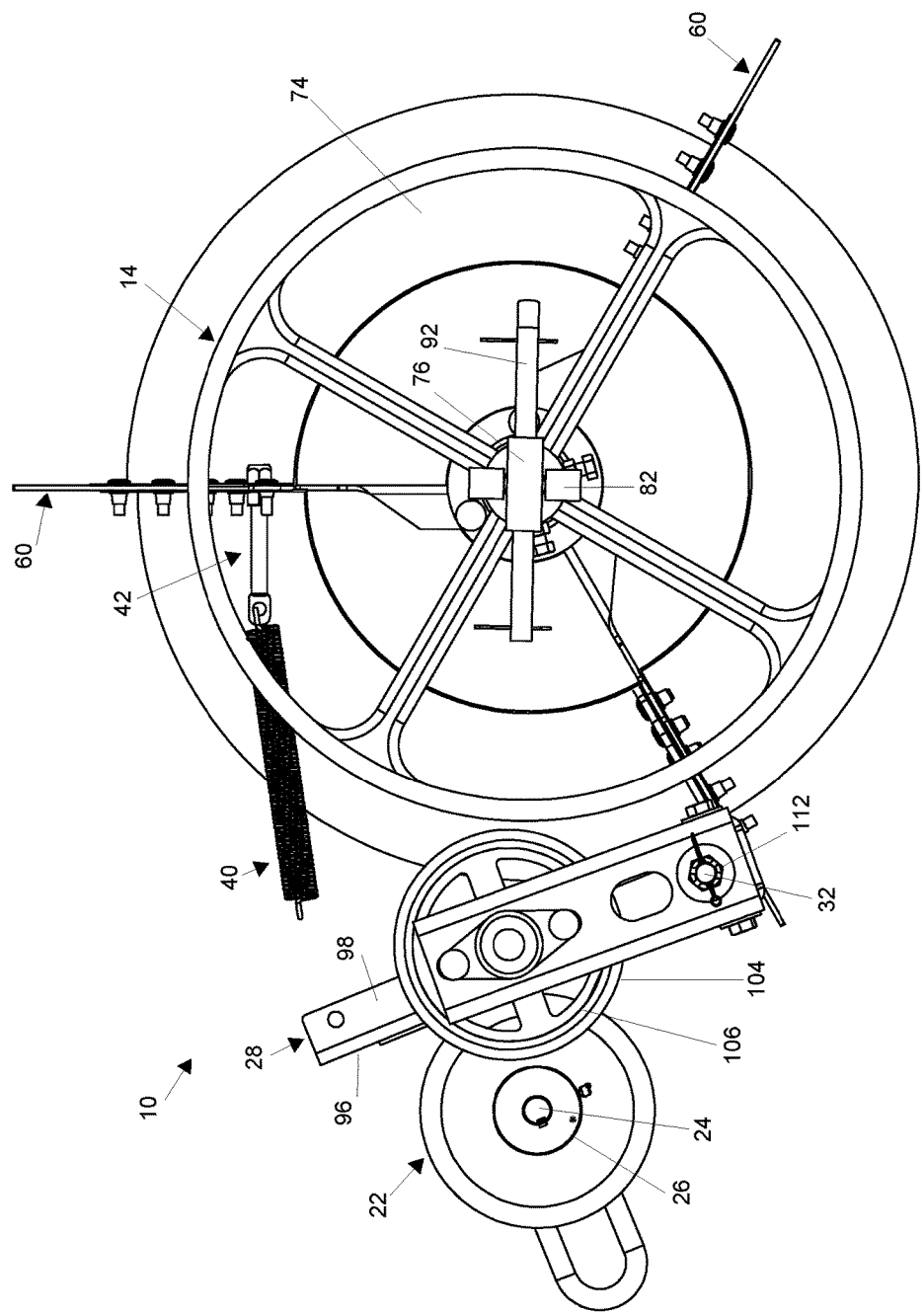
FIG. 8 is an elevation view of a bottom side of the friction driven grain spreader system of FIG. 2, the view showing the spreader pan removed so as to provide improved visibility within the spreader cone.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the invention.

System:

With reference to the figures, a friction driven beltless grain spreader system 10 (system 10) is presented. The friction driven beltless grain spreader system 10 includes the component pieces of a spreader cone 12 having a pulley 14 and a spreader pan 16 (also known as a deflector) connected by a main bearing tube 18 and pitch adjusting rod 20; a motor 22 having a drive shaft 24 and a driven wheel 26 connected to the spreader cone 12 by a motor bracket 28 connected to a support bracket 30 by a pivot pin 32; an idler wheel 34 connected to an idler shaft 36 and an idler bracket 38 connected to the support bracket 30 by pivot pin 32; and a tension member 40 having an adjustment member 42 that extends between the motor bracket 28 and spreader cone 12.

Grain Bin:

Friction driven beltless grain spreader system 10 is configured to be used in association with a grain bin 44, however any other application is hereby contemplated. In one arrangement, as is shown, grain bin 44 is a large generally cylindrical structure having a floor 46, a sidewall 48 and a peaked roof 50 having an opening 52 in approximately its center. In the arrangement shown, as one example, system 10 is positioned just below the opening 52 in the center of the peaked roof 50. System 10 is positioned in this manner so as to catch grain as it is poured into the grain bin 44 and evenly distribute it within the grain bin 44.

Spreader Cone:

Spreader cone 12 is formed of any suitable size shape and design and is configured to catch and gather the flowing grain as it is poured into the grain bin 44 and funnel the grain towards the spreader pan 16. In the arrangement shown, as one example, spreader cone 12 has a generally cone-shaped or funnel-shaped sidewall 54 that extends from an upper edge 56 to a lower edge 58. Sidewall 54 narrows as it extends downward from the upper edge 56 to the lower edge 58. In the arrangement shown, the sidewall 54 of spreader cone 12 is formed out of three sections that are connected to one another at seams or flanges, wherein each section forms approximately one third or 120° of the cylinder. Adjacent sections of sidewall 54 are connected to one another by any manner, method or means such as screwing, bolting, welding or the like. While three sections are shown, any number of sections are hereby contemplated for use such as one, two, four, five or more.

A support member 60 is positioned at the intersection of adjacent sections of sidewall 54. Support member 60 is itself formed of any suitable size, shape and design and serves to provide structural rigidity to spreader cone 12 as well as serve as an attachment member when installing the system 10 in grain bin 44. In the arrangement shown, as one example, support member 60 is generally planar in shape and extends form an exterior edge 62 that is exterior to sidewall 54 to an interior edge 64 that terminates near the center of spreader cone 12 and may connect to other components of the system 10 adjacent the center of spreader cone 12. Support member extends from an upper edge 66 that is above the upper edge 56 of spreader cone 12 to a lower edge 68 that terminates at or near the lower edge 58 of spreader cone 12. Support members 60 connect to upper bearing 70 and lower bearing 72 at or near their interior edge 64. Support members 60 are sandwiched between adjacent sections of sidewall 54 at or near their exterior edge 62. In the arrangement shown, adjacent sections of sidewall 54 are bolted together at seams or flanges with support member 60 positioned between the sections of sidewall 54, however any other manner, method or means of connecting the components together is hereby contemplated for use.

Main Bearing Tube & Pitch Adjusting Rod:

Main bearing tube 18 and pitch adjusting rod 20 are formed of any suitable size, shape and design and are connected to spreader cone 12 by any manner, method or means. In the arrangement shown, main bearing tube 18 is a generally cylindrical hollow tube and pitch adjusting rod 20 is a generally cylindrical shaft that is configured to slidably fit within main bearing tube 18. Main bearing tube 18 and pitch adjusting rod 20 are positioned at approximately the center of spreader cone 12 and extend in a generally vertical manner along a central axis of the spreader cone 12. In the arrangement shown, main bearing tube 18 and pitch adjusting rod 20 are held by upper bearing 70 and lower bearing 72. The connection to upper bearing 70 and lower bearing 72 facilitate rotation of main bearing tube 18 and pitch adjusting rod 20 within spreader cone 12.

In the arrangement shown, a pre-spread ring 74 is positioned within spreader cone 12. Pre-spread ring 74 is generally circular and planar in shape and includes an opening at its center. In the arrangement shown, pre-spread ring 74 connects to spreader cone 12 just above upper bearing 70. Pre-spread ring 74 serves to engage and deflect grain and more equally distributes and centers the grain, as well as the fines therein, within the spreader cone 12. In this way, pre-spread ring improves the performance of grain spreader 10.

Pulley 14 is connected at or near the lower end of main bearing tube 18. Spreader pan 16 is connected at or near the lower end of main bearing tube 18 and pitch adjusting rod 20. The lower end of pitch adjusting rod 20 includes a hollow collar 76.

Pulley:

Pulley 14 is formed of any suitable size, shape and design and serves to facilitate rotation of spreader pan 16. In the arrangement shown, pulley 14 is formed of a generally cylindrical wheel having a generally flat or smooth exterior surface. In another arrangement, to increase friction between idler wheel 34 and pulley 14 and ensure transfer of torque or rotation from the idler wheel 34 to the pulley 14, the exterior surface of pulley 14 is roughened, abraded, knurled or includes any other friction imparting or friction improving surface treatment.

Pulley 14 includes a plurality of spokes that connect to a centrally positioned hub 78. Hub 78 connects at or near the lower end of main bearing tube 18 and includes one or more locking members 80, which in the arrangement shown are locking screws or bolts that tighten hub 78 against main bearing tube 18. In the arrangement shown, to provide maximum durability and extended life, pulley 14 is formed of a metallic material. In one arrangement, pulley 14 includes a coating or layer or attached component at its outward end around its periphery that is formed of a compressible material such as a plastic, composite, rubber or any other nonmetallic material. In one arrangement, this added material has a higher coefficient of friction than the metallic material that forms the inner portions of pulley 14 which provides improved grip between pulley 14, idler wheel 34 and/or driven wheel 26. In one arrangement, this added material is compressible, or more compressible than the metallic material that forms the inner portions of pulley 14 which provides improved give and vibration dampening between pulley 14, idler wheel 34 and/or driven wheel 26. Also, in the arrangement shown, the center of pulley 14 is largely open which allows grain to fall through the pulley 14 from the spreader cone 12 to the spreader pan 16.

In the arrangement shown, one or more eyelets 82 are positioned at or near the lower end of main bearing tube 18 and just below where pulley 14 connects to main bearing tube 18. Eyelets 88 are configured to facilitate a pivoting connection to the upper end of control arms 84.

Spreader Pan:

Spreader pan 16 is formed of any suitable size, shape and design and is configured to direct falling grain outward as the spreader pan 16 is rotated under the power of motor 22. In the arrangement shown, as one example, spreader pan 16 is formed of a pair of opposing spreader fins 86 that themselves include a plurality of eyelets 88 therein. These spreader fins 86 have a generally flat main body with upwardly turned edges, however any other shape is hereby contemplated for use, such as an impeller shape or the like. Spreader fins 86 may include one or more vanes 90 in the main body positioned between the opposing upwardly turned edges.

Spreader pan 16 is assembled by aligning the eyelets 88 adjacent the inward edges of spreader fins 86 with the collar 76 attached to the end of pitch adjusting rod 20. Once the openings in the eyelets 88 of spreader fins 86 and the opening in collar 76 are aligned fin pin 92 is inserted there through thereby locking the spreader fins 86 to the pitch adjusting rod 20. Next, the upper end of control arms 84 are inserted into the eyelets 82 in the lower end of main bearing tube 18 and the lower end of control arms 84 are inserted into the centrally positioned eyelet 88 in the spreader fins 86.

Once spreader pan 16 is assembled, the length of pitch adjusting rod 20 is adjusted relative to main bearing tube 18. The longer pitch adjusting rod 20 extends past the lower end of main bearing tube 18 the flatter the angle of the spreader fins 86. In contrast, the shorter the pitch adjusting rod extends past the lower end of the main bearing tube 18 the greater the downward angle of the spreader fins 86. The length of pitch adjusting rod 20 is adjusted by operating adjustment member 94 positioned at the upper end of main bearing tube 18. In the arrangement shown, adjustment member 94 is positioned just above the upper end of main bearing tube 18 and is formed of a threaded nut and shaft arrangement, however any other arrangement is hereby contemplated for use. The angle of the spreader pan 16 is adjusted using pitch adjusting rod 20 to provide optimal performance based on the input variables such as grain flow rate, rotational speed of the spreader pan 16, grain bin size, grain type, and any other factor. As the length of the rod 20 that extends out of the main bearing tube 18 is adjusted, the angle of the spreader fins 86 changes.

Motor:

Motor 22 is formed of any suitable size, shape and design, and is configured to provide rotation to spreader pan 16. In the arrangement shown, motor 22 is a conventional electric motor and includes a drive shaft 24 that extends outward and downward from the main body of motor 22. A driven wheel 26 is connected at or near the end of drive shaft 24.

Driven wheel 26 is generally cylindrical in shape and has a relatively small diameter when compared to the diameter of idler wheel 34 or pulley 14. In one arrangement, the exterior surface of driven wheel 26 is generally flat or smooth. In another arrangement, to increase friction between driven wheel 26 and idler wheel 34 and ensure transfer of torque or rotation from the driven wheel 26 to the idler wheel 34 without excessive slippage, the exterior surface of driven wheel 26 is roughened, abraded, knurled or includes any other friction imparting or friction improving surface treatment. In the arrangement shown, to provide maximum durability and extended life, driven wheel 26 is formed of a metallic material, however any other material is hereby contemplated for use such as a ceramic, a plastic, a composite or the like. In one arrangement, driven wheel 26 includes a coating or layer or attached component at its outward end around its periphery that is formed of a compressible material such as a plastic, composite, rubber or any other nonmetallic material. In one arrangement, this added material has a higher coefficient of friction than the metallic material that forms the inner portions of driven wheel 26 which provides improved grip between pulley 14, idler wheel 34 and/or driven wheel 26. In one arrangement, this added material is compressible, or more compressible than the metallic material that forms the inner portions of driven wheel 26 which provides improved give and vibration dampening between pulley 14, idler wheel 34 and/or driven wheel 26.

In the arrangement shown, motor 22 is positioned to the side of spreader cone 12 and therefor motor 22 is positioned outside of the flow of grain. As such, the motor 22 remains much cleaner than if it was positioned in the flow of grain which reduces the wear and tear on the motor 22. In addition, by being positioned to the side of spreader cone 12 the motor 22 does not receive direct impacts from the grain. Also, by being outside of the flow of grain motor 22 does not need to be fully enclosed or sealed which allows for greater heat dissipation as compared to an enclosed or sealed motor. Another benefit to positioning motor 22 to the side of spreader cone 12 is that in this position motor 22 is surrounded by cooling airflow instead of hot grain.

Motor 22 is connected to spreader cone 12 by any manner, method or means. In the arrangement shown, motor 22 is connected to spreader cone 12 by a bracketing arrangement including a motor bracket 28 that is pivotally connected by pivot pin 32 to a support bracket 30. In this arrangement, motor bracket 28 is screwed, bolted or otherwise affixed to motor 22 and support bracket 30 is screwed, bolted, welded or otherwise affixed to spreader cone 12.

Motor bracket 28 is formed of any suitable size, shape and design and facilitates connection to motor 22 and to support bracket 30. In the arrangement shown, motor bracket 28 includes a generally flat center section 96 that connects to a pair of outwardly extending flanges 98, one flange on each of the upper edge and lower edge of center section 96. In this way, motor bracket 28 is formed in a generally C-shaped manner when viewed from an end, which provides strength and rigidity to motor bracket 28. The rearward ends of flanges 98 include openings that receive pivot pin 32 there through.

Support bracket 30 is formed of any suitable size, shape and design and facilitates connection to spreader cone 12 and to motor bracket 28. In the arrangement shown, support bracket 30 has a generally flat and planar main body 100. The inward edge of support bracket 30 is attached to sidewall 54 adjacent a support member 60. In this position, the inward edge of support bracket 30 is screwed, bolted or otherwise affixed to sidewall 54 along with support member 60, which provides additional strength and rigidity to the system 10.

The outward end of support bracket 30 includes a pair of ears 102 that extend out-of-plane with the generally planar main body 100 of support bracket 30, one ear 102 on each of the upper edge and lower edge of main body 100. These ears 102, like flanges 98 of motor bracket 28, include openings that receive pivot pin 32 there through.

In the arrangement shown, motor bracket 28 pivotally connects to support bracket 30 by placing the ears 102 of support bracket 30 in overlapping condition with the rearward end of flanges 98 of motor bracket 28 such that the openings in both the ears 102 and both flanges 98 align with one another. Once the openings in the ears 102 and flanges 98 are aligned, pivot pin 32 is inserted there through thereby pivotally connecting the motor bracket 28 to the support bracket 30. In the arrangement shown, the flanges 98 of motor bracket 28 fit just within the ears 102 of support bracket 30.

Idler Wheel:

Idler wheel 34 is formed of any suitable size, shape and design, and is configured to engage driven wheel 26 connected to motor 22 on one side and pulley 14 connected to spreader cone 12 on the other side and serves to transfer torque and rotation there between. Idler wheel 34 is also configured to provide an appropriate amount or give or slippage to the system 10, and more specifically to provide an appropriate amount of give or slippage between driven wheel 26 and pulley 14.

In the arrangement shown, idler wheel 34 is generally cylindrical in shape and has a diameter that is larger than driven wheel 26 but smaller than pulley 14. In one arrangement, the exterior surface of driven wheel 26 is generally flat or smooth. In another arrangement, to increase friction between driven wheel 26 and idler wheel 34 and ensure transfer of torque or rotation from the driven wheel 26 to the idler wheel 34, the exterior surface of idler wheel 34 is roughened, abraded, knurled or includes any other friction imparting or friction improving surface treatment, material or design.

To provide an amount of give or slip or shock absorption to the system 10, in one arrangement, idler wheel 34 is formed wholly of or partially of a compressible material or a semi-compressible material. In one arrangement, idler wheel 34 includes a compressible tire section 104 that is molded onto a rigid metallic core 106. This arrangement is not unlike a conventional tire and rim combination wherein the tire provides grip, slip and shock absorption while the rim provides strength, rigidity and support. In one arrangement, the tire section 104 is molded wholly or partially of a rubber material, a synthetic rubber material, a plastic material, an UHMW material, a poly material, a urethane material, a polyurethane material, a composite material or any other compressible or semi-compressible non-metallic material. In one arrangement, the wheel section is formed of a material having an 85 Shore A Durometer. However use of a material having any other measure of Shore hardness is hereby contemplated for use. The compressible tire section 104 may be a solid core tire arrangement where there is no space, air or tube between the tire section 104 and the rigid metallic core 106, or the compressible tire section 104 may include a space or air holding tube between a portion of the rigid metallic core 106 and the tire section 104. In an arrangement where there is a space between a portion of the tire section 104 and the metallic core 106 this space may be inflated and/or deflated to a specific air pressure, or the space may be fixed and pressure is not-adjustable. In one arrangement, pulley 14 and/or idler wheel 34 include similar arrangements with a rigid metallic core 106 and a tire section 104.

Idler shaft 36 extends through the approximate center of core 106 of idler wheel 34. Idler shaft 36 facilitates the rotation of idler wheel 34 there around. In the arrangement shown, idler shaft 36 extends upward from idler bracket 38, however any other arrangement is hereby contemplated for use, such as idler shaft 38 extending downward from idler bracket 38, or idler shaft 38 connecting on both its upper end and lower end to idler bracket 38.

Idler wheel 34 and idler shaft 36 are connected to spreader cone 12 by any manner, method or means. In the arrangement shown, idler shaft 36 is connected to spreader cone 12 by a bracketing arrangement including idler bracket 38 that is pivotally connected to support bracket 30 which is connected to spreader cone 12.

Idler bracket 38 is formed of any suitable size, shape and design and facilitates connection to idler wheel 34 and idler shaft 36 to support bracket 30. In the arrangement shown, idler bracket 38 is generally formed in an L-shape and includes a top idler bracket 108 and a bottom idler bracket 110, where the top idler bracket 108 is generally vertically aligned and the bottom idler bracket 110 is generally horizontally aligned. In one arrangement, top idler bracket 108 and bottom idler bracket 110 are formed of a single unitary piece, whereas in another arrangement, as is shown, top idler bracket 108 and bottom idler bracket 110 are formed of separate pieces that connect to one another by screwing, bolting, welding, affixing or by any other manner, method or means of connecting two components. In the arrangement shown, an opening extends vertically through the top idler bracket 108 and the rearward end of the bottom idler bracket 110. This opening is configured to receive the lower end of pivot pin 32 there through and to facilitate rotation of idler bracket 38 upon pivot pin 32.

In the arrangement shown, idler bracket 38 pivotally connects to support bracket 30 by placing the upper end of top idler bracket 108 against the lower surface of the lower ear 102 of support bracket 30. Once in this position, the openings in the ears 102 of support bracket 30, flanges 98 of motor bracket and the top idler bracket 108 are aligned, the pivot pin 32 is extended there through. Once the pivot pin 32 extends out the bottom of top idler bracket 108 a locking nut 112 is positioned over the lower end of pivot pin 32 thereby locking idler bracket 38 to support bracket 30 while allowing idler bracket to rotate upon pivot pin 32. While one idler wheel 34 is shown in use, any number of idler wheels 34 positioned between pulley 14 and driven wheel 26 are hereby contemplated for use such as one, two, three, four, five or more. Alternatively, no idler wheel 34 is present between pulley 14 and driven wheel 26.

Tension Member & Adjustment Member:

Tension member 40 is formed of any suitable size, shape and design, and is configured to provide tension between pulley 14, driven wheel 26 and idler wheel 34 such that when driven wheel 26 rotates idler wheel 34 rotates and when idler wheel 34 rotates pulley 14 rotates. That is, tension member 40 pulls motor 22 and driven wheel 26 inward towards spreader cone 12. Since idler wheel 34 is positioned between driven wheel 26 and pulley 14, tension from tension member 40 causes a frictional engagement between driven wheel 26 and idler wheel 34 as well as between idler wheel 34 and pulley 14. The greater the tension from tension member 40 the greater the frictional engagement between driven wheel 26, idler wheel 34 and pulley 14, and therefore less slippage or give between the driven wheel 26, idler wheel 34 and pulley 14. As the tension from tension member 40 is lessened the frictional engagement between driven wheel 26, idler wheel 34 and pulley 14 is reduced, and therefore more slippage or give between the driven wheel 26, idler wheel 34 and pulley 14 is provided.

In the arrangement shown, as one example, tension member 40 is formed of a spring that connects at one end to an opening in the forward end of motor bracket 28 and at its other end to an opening in an end of adjustment member 42. In the arrangement shown, an elongated tension spring is used to provide tension, however any other form of a tension imparting member is hereby contemplated for use.

Adjustment member 42 is formed of any suitable size, shape and design, and is configured to adjust the tension between pulley 14, driven wheel 26 and idler wheel 34 such that when driven wheel 26 rotates idler wheel 34 rotates and when idler wheel 34 rotates pulley 14 rotates. In the arrangement shown, as one example, adjustment member 42 is formed of a threaded shaft 114 having an opening on one end that facilitates connection to tension member 40. The threaded shaft 114 extends through the outwardly protruding flange or seam where a pair of opposing sections of sidewall 54 of spreader cone 12 come together with support member 60 sandwiched there between. A locking nut 116 is positioned on both sides of the outwardly protruding flange or seam where a pair of opposing sections of sidewall 54 of spreader cone 12 come together thereby locking the threaded shaft 114 in place.

In this arrangement, the tension on the tension member 40 is adjusted by adjusting the position of the locking nuts 116 on threaded shaft 114 of tension member 42. Once the proper tension is achieved from tension member 40, the threaded shaft 114 is locked in place by tightening the opposing locking nuts 116 against one another and over the outwardly protruding flange or seam where opposing sections of sidewall 54 of spreader cone 12 come together. Proper tension is achieved when driven wheel 26 rotates idler wheel 34 rotates and when idler wheel 34 rotates pulley 14 rotates while also allowing for a suitable amount of give or slip between driven wheel and pulley 14 when a spike in resistance occurs, such as when a heavy flow of grain initially hits a freewheeling spreader pan 16.

The tension produced by tension member 40 can, in a way, be measured by measuring the length of the free end of threaded shaft 114 of adjustment member 42. That is, in known configurations, the length of the threaded shaft 114 that extends past the outwardly protruding flange or seam of opposing sections of sidewall 54 should provide a direct indication of the tension provided by tension member 40. As such, the tension member 40 can be adjusted with relative precision by measuring and adjusting the length of the free end of adjustment member 42. Alternatively, the tension can be set by a trial-and-error method or by any other method.

Tension can also be adjusted by providing a plurality of openings in a flange 98 of motor bracket 28 and selecting which opening to attach the end of tension member 40 to. For increased tension, select an opening closer to the outward end of motor bracket 28. For decreased tension, select an opening closer to the rearward end of motor bracket 28. In this way, tension member 40 and motor bracket 28 provide a wide range of possible tension.

Alignment of Axis:

As is stated herein, motor 22 and corresponding driven wheel 26 as well as idler wheel 34 pivot on the axis of rotation formed by pivot pin 32. Idler wheel 34 is positioned between driven wheel 26 and pulley 14. In this arrangement, as one example, the axis of rotation 118 of the pulley 14, the axis of rotation 120 of idler wheel 34 and the axis of rotation 122 of driven wheel 26 are positioned in approximate parallel spaced alignment with one another. That is, the axis of rotation 118 of the pulley 14, the axis of rotation 120 of idler wheel 34 and the axis of rotation 122 of driven wheel 26 are all approximately vertically aligned.

Figure 9:
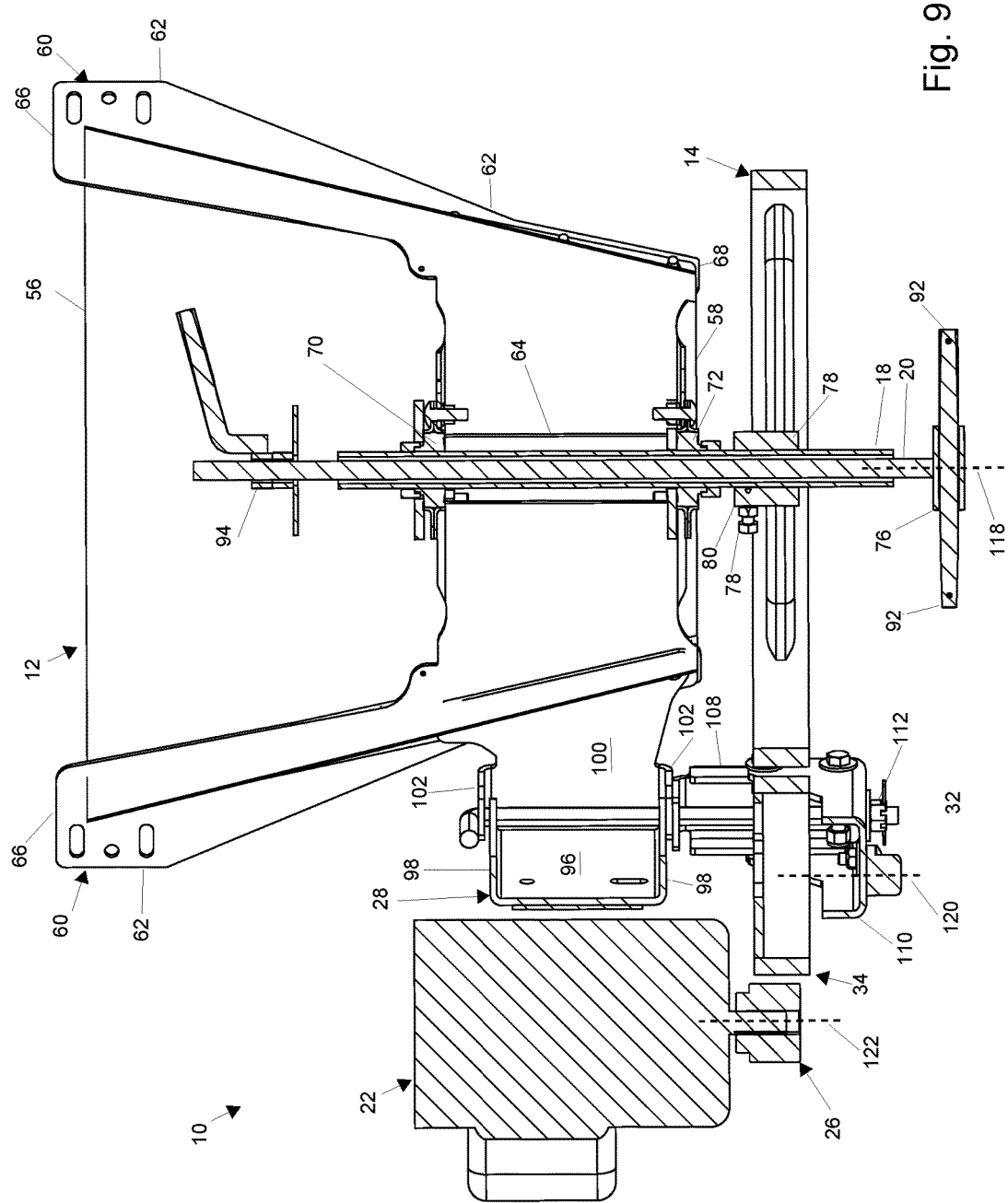
FIG. 9 is a cut-away elevation view of a side of the friction driven grain spreader system of FIG. 2, the view showing the axis of rotation of the pulley wheel, idler wheel and the driven wheel.
Figure 10:
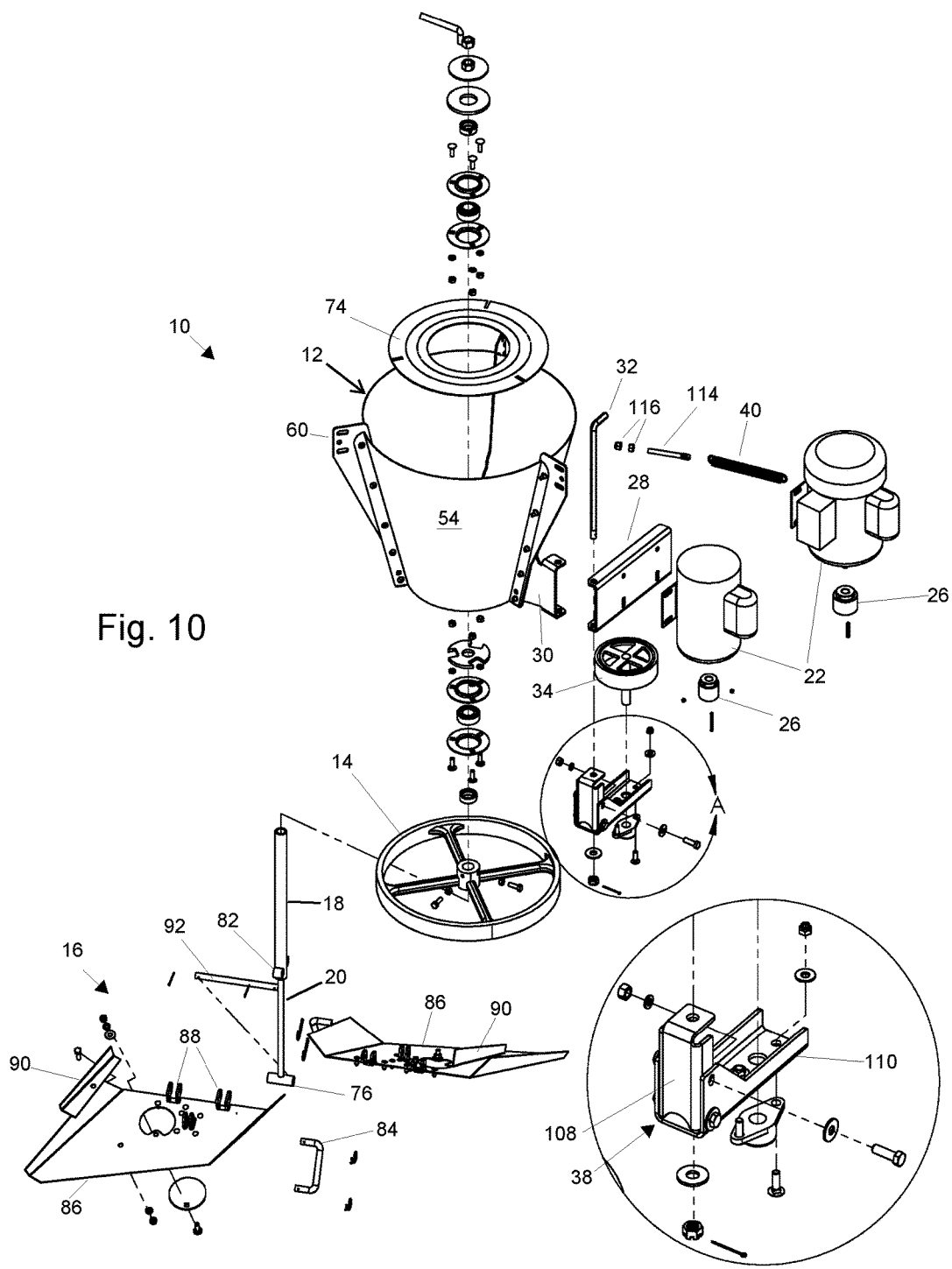
FIG. 10 is an exploded perspective view of the friction driven grain spreader system of FIG. 2, the view showing the component parts of the friction driven grain spreader system.
Figure 11:
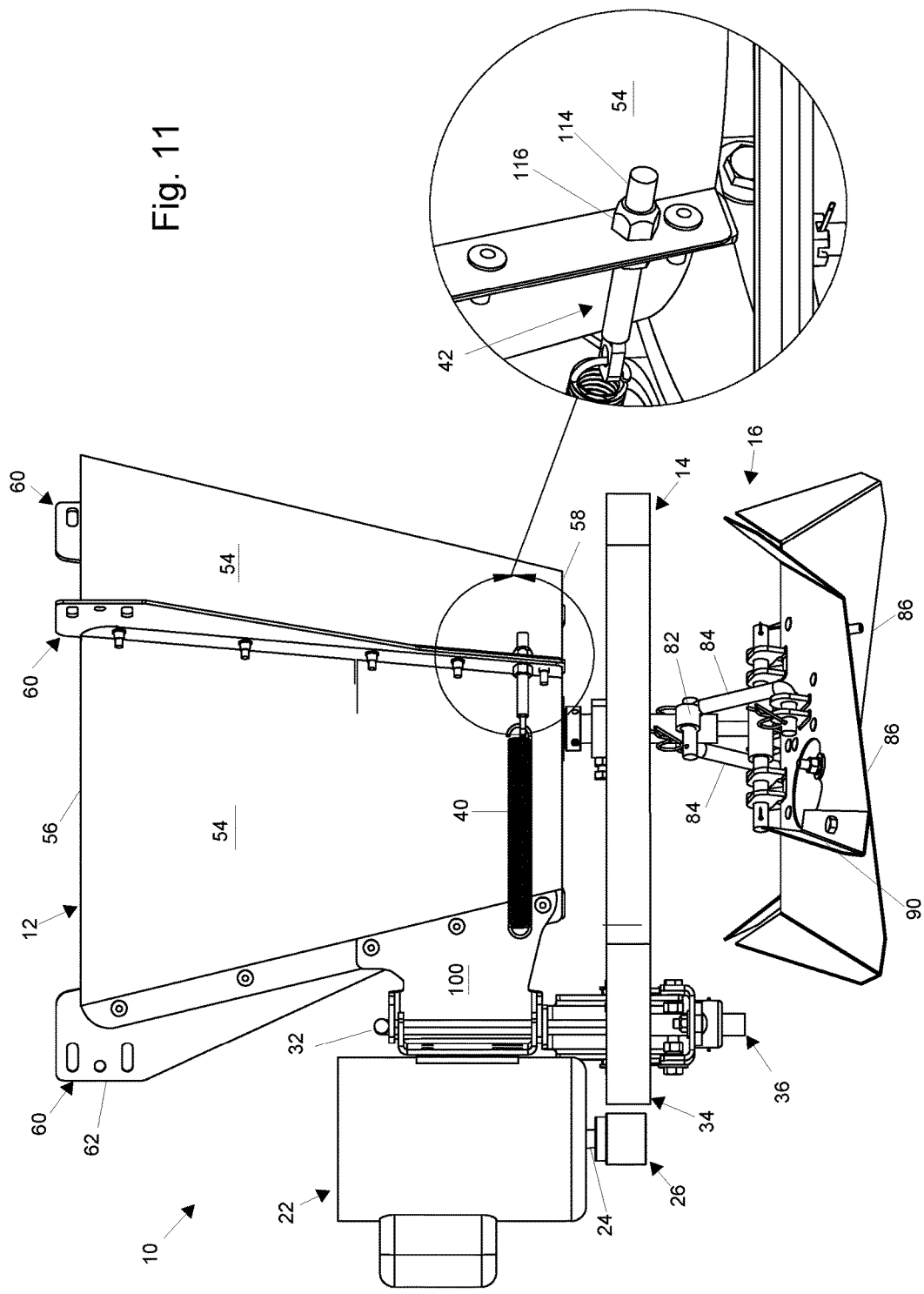
FIG. 11 is an elevation view of a front side of the friction driven grain spreader system of FIG. 2, the view showing a close up of a tension adjustment member connected to the spreader cone.

In addition, in one arrangement, the axis of rotation 118 of the pulley 14, the axis of rotation 120 of idler wheel 34 and the axis of rotation 122 of driven wheel 26 are positioned in approximate linear alignment or planar alignment with one another. Said another way, the idler wheel 34 is positioned approximately in the middle between driven wheel 26 and pulley 14 and a straight line or plane can be drawn through, or nearly through, axis of rotation 118 of the pulley 14, the axis of rotation 120 of idler wheel 34 and the axis of rotation 122 of driven wheel 26. This arrangement can be seen in the side cut-away view, FIG. 9, where a single planar cut through the system 10 cuts through approximately the center of the axis of rotation 118 of the pulley 14, the axis of rotation 120 of idler wheel 34 and the axis of rotation 122 of driven wheel 26. This arrangement, where the center of pulley 14, idler wheel 34 and driven wheel 26 are aligned in an approximate line or plane with one another provides an efficient torque transfer between driven wheel 26, idler wheel 34 and pulley 14. Also, the system 10 facilitates vertical adjustment of pulley 14, idler wheel 34 and driven wheel 26 which allows the pulley 14, idler wheel 34 and driven wheel 26 to be vertically aligned with one another. That is, as is shown in the figures, the vertical position of the pulley 14, driven wheel 26 and idler wheel 34 can be positioned in approximate planar alignment with one another. Or, said another way, the center of pulley 14, idler wheel 34 and driven wheel 26 can be aligned with one another to maximize contact between the pulley 14, idler wheel 34 and driven wheel 26. As such, the full surface area of adjacent wheels can contact one another. This provides for maximum torque transfer.

Gear Ratio:

While the system 10 presented herein does not include any gears, the relative gear ratio between the rotational speed of motor 22 to the rotational speed of main bearing tube 18, pitch adjusting rod 20 and spreader pan 16 is determined by the relative size of the driven wheel 26 and pulley 14. To adjust this gear ratio, different diameter wheels are used. As an example, to increase the speed of rotation of main bearing tube 18, pitch adjusting rod 20 and spreader pan 16 a larger driven wheel 26 or a smaller pulley 14 is used. As another example, to decrease the speed of rotation of main bearing tube 18, pitch adjusting rod 20 and spreader pan 16 a smaller driven wheel 26 or a larger pulley 14 is used. This system allows for essentially infinite gear ratio adjustments by merely changing the size of pulley 14 and/or driven wheel 26. This system also allows for quick, easy and simple relative gear ratio adjustments in the field by changing out of the pulley 14 and/or driven wheel 26, however driven wheel 26 tends to be easier to change in the field as compared to pulley 14.

In Operation:

The system 10 presented herein is installed within a grain bin 44 and is positioned just below the opening 52 in the center of the peaked roof 50. In one arrangement, the openings near the upper edge 66 of support members 60 are used to attach system 10 to the peaked roof 50 of grain bin 44. In this position, the spreader cone 12 is positioned to catch the flowing grain as it is poured into the grain bin 44

The motor 22, drive shaft 24 and driven wheel 26 are installed onto the spreader cone 12 by aligning the openings near the rearward edges of flanges 98 of motor bracket 28 with the openings in ears 102 of support bracket 30. Once in this position, pivot pin 32 is inserted through the aligned openings in flanges 98 and ears 102 thereby connecting motor 22, drive shaft 24 and driven wheel 26 to the spreader cone 12.

The idler wheel 34, idler shaft 36 and idler bracket 38 are installed onto the spreader cone 12 by aligning the opening near the rearward edge of top idler bracket 108 with the openings in flanges 98 of motor bracket 28 and the openings in ears 102 of support bracket 30. Once in this position, pivot pin 32 is further inserted through the aligned opening near the rearward edge of top idler bracket 108 thereby connecting idler wheel 34, idler shaft 36 and idler bracket 38 to the spreader cone 12.

The locking nut 112 is positioned over the lower end of pivot pin 32 thereby holding the motor 22, drive shaft 24 and driven wheel 26 and the idler wheel 34, idler shaft 36 and idler bracket 38 in place on the spreader cone 12.

The tension member 40 and adjustment member 42 are installed. To do so, the outward end of tension member 40, which in the arrangement shown is a tension spring, is looped over and/or connected to an opening in a flange 98 of motor bracket 28 and the opposite end of the tension member 40 is looped over and/or connected to an opening in an end of the threaded shaft 114 of adjustment member 42. The threaded shaft 114 is then passed through an opening in the outwardly protruding flange or seam where opposing sections of sidewall 54 of spreader cone 12 come together.

The tension on tension member 40 is adjusted by adjusting the position of the locking nuts 116 on threaded shaft 114. The proper tension can be determined, in one arrangement, by measuring the free end of the threaded shaft 114 that extends past the outwardly protruding flange or seam where opposing sections of sidewall 54 of spreader cone 12 come together.

The force of the tension generated by the tension member 40 pulls the driven wheel 26 into contact with the idler wheel 34 and pulls the idler wheel 34 into contact with the pulley 14. Once the driven wheel 26 is in contact with the idler wheel 34 which is in contact with the pulley 14 rotation of one wheel 14, 26, 34 rotates the other wheels 14, 26, 34.

More specifically, when the motor 22 is activated the motor 22 rotates the driven wheel 26. Due to the frictional contact between the driven wheel 26 and idler wheel 34, when driven wheel 26 rotates this causes rotation of idler wheel 34. Due to the small relative diameter of driven wheel 26 the material properties, shape or surface treatment, if any, of driven wheel 26 helps to provide grip and transfer torque between driven wheel 26 and idler wheel 34. Due to the frictional contact between the idler wheel 34 and the pulley 14, when driven wheel 26 rotates this causes rotation of idler wheel 34 which causes rotation of the pulley 14.

As grain is poured through the opening 52 in the peaked roof 50 of grain bin 44, the falling grain is caught by the spreader cone 12. The funnel shape of the spreader cone 12 helps to funnel the grain inward as it moves downward. The grain passes through the adjacent support members 60, out the bottom of the spreader cone 12 and into engagement with the spreader pan 16. As the motor 22 rotates, so rotates the spreader pan 16, albeit at a slower rate. As the grain engages the spreader pan 16 the rotation of the spreader pan 16 has a tendency to throw or sling the grain, as well as the fines therein, outward, thereby facilitating even distribution of the grain, as well as the fines therein, within the grain bin 44.

In the arrangement wherein pulley 14 and driven wheel 26 are formed of metallic materials, and the idler wheel 34 is formed of a rubber material, a synthetic rubber material, a plastic material, an UHMW material, a composite material or any other compressible or semi-compressible material and/or non-metallic material the forgiving nature of the material of the idler wheel 34 helps to absorb shock and vibration as well as provide smoother operation of the system 10. In addition, in the event of a spike in forces occurs, such as the motor 22 suddenly being turned on, turned off or reversed, or a sudden heavy flow of grain hits the spreader pan 16 there is give or slippage between the driven wheel 26, idler wheel 34 and pulley 14.

As an example, in the event that the motor 22 is suddenly turned on when the pulley 14 and idler wheel 34 are stationary, some slippage or give is likely to occur between the driven wheel 26 and the idler wheel 34 and/or the pulley 14 until the rotation of the idler wheel 34 and pulley 14 catch up to the rotation of the driven wheel 26.

As another example, in the event that a heavy flow of grain suddenly hits the spreader pan 16, some slippage or give is likely to occur between the pulley 14 and the driven wheel 26 and/or idler wheel 34 until the rotation of the pulley 14 catch up to the rotation of the driven wheel 26 and idler wheel 34.

If give or slippage occurs too easily, the adjustment member 42 can be tightened. If on the other hand, not enough give or slippage occurs, the adjustment member 42 can be loosened.

Also, during operation as forces change due to the constantly changing properties of the flowing grain the flexible or compressible nature of the idler wheel 34, and/or pulley 14 and driven wheel 26, helps to absorb shock and vibration. In this way, the flexible or compressible nature of the idler wheel 34 helps to provide smoother and quieter operation of the system 10.

Another benefit of the system 10 is that the motor 22 can be driven in either rotational direction, clockwise or counterclockwise. The reversibility of the system 10 allows for a more-even grain distribution as the motor 22 can be switched between directions during operation.

From the above discussion it will be appreciated that the friction driven beltless grain spreader system and related method of use, presented herein improves upon the state of the art.

Specifically, the friction driven beltless grain spreader system: has a long useful life; is durable; places the motor outside of the flow of grain; provides a sufficient amount of give when forces spike; allows for slippage between the motor and the grain spreader when necessary; eliminates the use of a belt; eliminates the use of direct-drive gears; reduces maintenance; provides even spreading of grain; does not require sealing of the motor; does not inhibit cooling of the motor; is reliable; is easy to manufacture; allows for forward and reverse operation; is relatively inexpensive; has a robust design; is high quality; reduces downtimes; improves efficiencies, among countless other advantages and improvements.

It will be appreciated by those skilled in the art that other various modifications could be made to the device without parting from the spirit and scope of this invention. All such modifications and changes fall within the scope of the claims and are intended to be covered thereby.

What is claimed:

1. A grain spreader system, comprising:
a spreader cone;
a pulley operably connected to the spreader cone;
a deflector operably connected to the pulley;
a motor;
the motor having a drive shaft;
a driven wheel connected to the drive shaft;
an idler wheel;
wherein the idler wheel is positioned between the pulley and the drive wheel;
wherein the driven wheel, idler wheel and pulley are in operative frictional engagement with one another;
wherein the idler wheel includes a tire section formed of a compressible nonmetallic material and a rigid metallic core;
wherein operation of the motor causes rotation of the driven wheel which causes rotation of the idler wheel which causes rotation of the pulley which causes rotation of the deflector;
wherein the presence of the tire section formed of a compressible nonmetallic material on the idler wheel absorbs shock and vibration.

2. The system of claim 1 wherein when forces spike, the idler wheel facilitates slippage between the driven wheel and the pulley.

3. The system of claim 1 wherein when forces exceed the frictional engagement between the driven wheel, idler wheel and pulley, at least one of the driven wheel, idler wheel or pulley slip with respect to the others.

4. The system of claim 1 wherein the pulley is rotatably connected to the spreader cone.

5. The system of claim 1 wherein the pulley is positioned above the deflector.

6. The system of claim 1 wherein the grain spreader is reversible.

7. The system of claim 1 wherein the axis of rotation of the pulley, the driven wheel and the idler wheel are positioned in approximate parallel spaced alignment to one another.

8. The system of claim 1 wherein the compressible nonmetallic material of the idler wheel is formed of a rubber, plastic or composite material.

9. The system of claim 1 wherein the tire section of the idler wheel is formed of a material selected from the group consisting of: a rubber material, a synthetic rubber material, a plastic material, an ultra-high molecular weight material, a poly material, a urethane material, a polyurethane material, and a composite material.

10. The system of claim 1 wherein the driven wheel and pulley wheel are formed of a metallic material.

11. The system of claim 1 wherein the motor is connected to the spreader cone at a pivot point.

12. The system of claim 1 wherein the idler wheel is connected to the spreader cone at a pivot point.

13. The system of claim 1 wherein the motor and the idler wheel are connected to the spreader cone at a pivot point.

14. A grain spreader system, comprising:
a spreader cone;
a pulley operably connected to the spreader cone such that the pulley rotates with respect to the spreader cone;
an idler wheel positioned between a driven wheel and the pulley;
the idler wheel having a rigid metallic core and a tire section formed of a compressible nonmetallic material;
a motor connected to the driven wheel;
a deflector connected to the pulley;
wherein when the motor is activated and grain is poured into the spreader cone, the deflector rotates and spreads the grain;
wherein the presence of the tire section formed of a compressible nonmetallic material on the idler wheel absorbs shock and vibration.

15. The system of claim 14 wherein when forces spike, the idler wheel facilitates slippage between the driven wheel and the pulley.

16. The system of claim 14 wherein when forces exceed the frictional engagement between the driven wheel, idler wheel and pulley, at least one of the driven wheel, idler wheel or pulley slip with respect to the others.

17. The system of claim 14 wherein the axis of rotation of the pulley wheel, the driven wheel and the idler wheel are positioned in approximate alignment to one another.

18. The system of claim 14 wherein a tensioning member pulls the driven wheel and idler wheel into contact with one another.

19. The system of claim 14 wherein the tire section of the idler wheel is formed of a material selected from the group consisting of: a rubber material, a synthetic rubber material, a plastic material, an ultra-high molecular weight material, a poly material, a urethane material, a polyurethane material, and a composite material.

20. A grain spreader, comprising:
a spreader cone;
an idler wheel positioned between a driven wheel and a pulley;
a motor connected to the drive wheel;
a deflector connected to the pulley;
a tension member connected to the spreader cone and the motor;
the tension member configured to pull the drive wheel, the idler wheel and the pulley into frictional engagement with one another;
wherein the idler wheel includes a tire section formed of a compressible nonmetallic material and a rigid metallic core;
wherein the presence of the tire section formed of a compressible nonmetallic material on the idler wheel absorbs shock and vibration.

21. A grain spreader system, comprising:
a spreader cone;
a pulley operably connected to the spreader cone;
a deflector operably connected to the pulley;
a motor;
the motor having a drive shaft;
a driven wheel connected to the drive shaft;
an idler wheel;
wherein the driven wheel is pivotally connected relative to the pulley and the idler wheel;
wherein the idler wheel is pivotally connected relative to the pulley and the driven wheel such that the relative position of the pulley and the driven wheel may change with respect to the idler wheel;
wherein the idler wheel is positioned between the pulley and the drive wheel;
wherein a tensioning member pulls the driven wheel the idler wheel and the pulley into contact with one another such that the driven wheel, the idler wheel and the pulley are in operative frictional engagement with one another;

wherein operation of the motor causes rotation of the driven wheel which causes rotation of the idler wheel which causes rotation of the pulley which causes rotation of the deflector.

22. The system of claim 21, further comprising:

wherein the idler wheel includes a tire section formed of a compressible nonmetallic material and a rigid metallic core;

wherein the presence of the tire section formed of a compressible nonmetallic material on the idler wheel absorbs shock and vibration.

\* \* \* \* \*